(12) United States Patent
Druckman et al.

(10) Patent No.: US 9,840,331 B2
(45) Date of Patent: Dec. 12, 2017

(54) DEPLOYABLE DINING TABLE

(71) Applicant: B/E Aerospace, Inc., Wellington, FL (US)

(72) Inventors: David J. Druckman, Tuscon, AZ (US); Ian L. Frost, Tucson, AZ (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 15/097,361

(22) Filed: Apr. 13, 2016

(65) Prior Publication Data

US 2016/0297532 A1    Oct. 13, 2016

Related U.S. Application Data

(60) Provisional application No. 62/146,594, filed on Apr. 13, 2015.

(51) Int. Cl.
| | | |
|---|---|---|
| *A47B 23/00* | (2006.01) | |
| *B64D 11/06* | (2006.01) | |
| *A47B 5/04* | (2006.01) | |
| *A47B 1/05* | (2006.01) | |
| *A47B 5/00* | (2006.01) | |
| *A47B 21/03* | (2006.01) | |
| *A47B 46/00* | (2006.01) | |
| *A47B 88/407* | (2017.01) | |

(52) U.S. Cl.
CPC ............ *B64D 11/0638* (2014.12); *A47B 1/05* (2013.01); *A47B 5/006* (2013.01); *A47B 5/04* (2013.01); *A47B 21/03* (2013.01); *A47B 46/00* (2013.01); *A47B 88/407* (2017.01); *A47B 2021/0335* (2013.01)

(58) Field of Classification Search
CPC ........................ A47B 21/03; A47B 2021/0321
USPC ............ 108/42, 143, 138, 50.01, 50.02, 96; 248/429, 918, 240.4, 240
See application file for complete search history.

(56) References Cited

U.S. PATENT DOCUMENTS

| | | | | |
|---|---|---|---|---|
| 138,537 | A * | 5/1873 | Sheaffer ............. | A47B 21/0314 108/138 |
| 160,651 | A * | 3/1875 | Cost ................... | A47B 21/0314 108/138 |
| 605,198 | A * | 6/1898 | Elliot ................. | G09B 19/0061 248/240 |
| 3,428,382 | A * | 2/1969 | Yarnell .............. | A47B 21/0314 312/208.1 |
| 4,496,200 | A * | 1/1985 | Hagstrom .......... | A47B 21/0314 108/138 |
| 4,717,112 | A * | 1/1988 | Pirkle .................... | A47B 21/02 108/140 |
| 4,736,689 | A * | 4/1988 | Stanko ............... | A47B 21/0314 108/143 |

(Continued)

*Primary Examiner* — Jose V Chen
(74) *Attorney, Agent, or Firm* — Shumaker, Loop & Kendrick, LLP

(57) ABSTRACT

A deployable table assembly including a table, first and second non-parallel static rails, and first and second hinges attaching the table to the first and second non-parallel static rails, wherein the first and second hinges configured to travel along the first and second non-parallel static rails to move the table between a stowed position and a deployed position, wherein the table when in the deployed position is forward of and vertically lower than the table when in the stowed position.

15 Claims, 4 Drawing Sheets

(56) References Cited

U.S. PATENT DOCUMENTS

| | | | | |
|---|---|---|---|---|
| 5,294,087 | A | * | 3/1994 | Drabczyk ............ A47B 21/007 108/138 |
| 5,490,466 | A | * | 2/1996 | Diffrient ............ A47B 21/0314 108/138 |
| 5,626,323 | A | * | 5/1997 | Lechman ........... A47B 21/0314 108/137 |
| 5,707,034 | A | * | 1/1998 | Cotterill ............. A47B 21/0314 108/5 |
| 7,047,890 | B2 | * | 5/2006 | Korber ............... A47B 21/0073 108/50.01 |
| 7,654,208 | B2 | * | 2/2010 | Patten ................. A47B 46/005 108/138 |
| 7,946,551 | B1 | * | 5/2011 | Cvek .................. A47B 21/0314 248/118 |
| 8,905,248 | B1 | * | 12/2014 | Wolski .................. A47B 43/00 108/108 |
| 9,554,644 | B2 | * | 1/2017 | Flaherty .................... A47B 9/18 |
| 9,596,929 | B2 | * | 3/2017 | Koulizakis ......... A47B 21/0314 |
| 2005/0103960 | A1 | * | 5/2005 | Kirchhoff .......... A47B 21/0314 248/274.1 |

* cited by examiner

DEPLOYABLE DINING TABLE

CROSS-REFERENCE TO RELATED APPLICATION

This application claims priority from U.S. Application No. 62/146,594 filed Apr. 13, 2015, the entirety of which is incorporated by reference herein.

TECHNICAL FIELD AND BACKGROUND OF THE INVENTION

The present invention relates generally to a deployable dining table associated with an aircraft passenger seat, and more particularly, to a dining table hinged for compound movement between a stowed position beneath a fixed vanity table and a deployed ergonomic position for dining or other use.

Airlines offering business and premium seating classes often incorporate passenger suites into their cabin layouts. Suites are typically defined by privacy walls and include lie-flat adjustable seats, vanities, desks, video monitors, tables, etc. In certain configurations, vanities and desks can take the form of static structures positioned forward of the seat. While forward spacing facilitates seat ingress, egress and full horizontal adjustability, it makes it impractical and uncomfortable to use these static structures for working and dining purposes. Therefore, additional tables that deploy closer to the seat are necessary.

Tray tables have historically been deployable from one of an armrest positioned alongside the seat, a monument laterally adjacent the seat, or from beneath a desk positioned forward of the seat. In each of the foregoing configurations it is necessary to move the table between a stowed position and a deployed use position. Armrest and monument deployable tables require complex hinges in order to change the orientation of the table for stowing and use, e.g., from vertical to horizontal. Tables that deploy from beneath a forward static structure require linear movement forward and aft. Because most vanities, desks and like forward static structures have a different height than the ergonomic height of a dining table, complex mechanisms are necessary to deploy the table towards the user and lower the table to the proper ergonomic height.

Therefore, to overcome the disadvantages of prior art deployable tables and complex hinge mechanisms, what is needed is a mechanism that provides compound movement for a forward positioned deployable dining table.

BRIEF SUMMARY OF THE INVENTION

It is an object of the invention to provide a table associated with a seat that is movable between a stowed position and an ergonomic use position.

It is another object of the invention to provide a mechanism that imparts vertical and horizontal translation of a table, thus providing a difference in the vertical and horizontal positions in stowed and deployed positions of the table.

It is yet another object of the invention to provide a table that deploys from beneath a static structure positioned forward of a seat.

It is yet another object of the invention to provide a table that stows apart from a passenger seat to permit seat ingress, egress and full adjustability, and deploys to an ergonomic position close to the seat for dining or other use.

It is yet another object of the invention to provide a table movement mechanism in a compact package conducive for aircraft usage.

To achieve the foregoing and other objects and advantages, in a first embodiment the present invention provides a deployable table assembly including a table, first and second non-parallel static rails, and first and second hinges attaching the table to the first and second non-parallel static rails, the first and second hinges configured to travel along the first and second non-parallel static rails to move the table between a stowed position and a deployed position, wherein the table when in the deployed position is forward of and vertically lower than the table when in the stowed position.

In another aspect, each of the first and second hinges can be attached at one end to one side of the table and at an opposite end to a carriage configured to travel along one of the first and second non-parallel static rails.

In yet another aspect, the first and second non-parallel static rails may converge in a direction of the stowed position and diverge in a direction of the deployed position.

In yet another aspect, the first and second hinges may rotate toward a vertical orientation as the table travels from the stowed position to the deployed position, and the first and second hinges may rotate toward a horizontal orientation as the table travels from the deployed position to the stowed position.

In yet another aspect, upper ends of the first and second hinges may move toward each other as the table travels in a direction of the stowed position and may move apart from one another as the table travels in a direction of the deployed position.

In yet another aspect, the first and second non-parallel static rails may be adapted to be attached to an underside of a static structure positioned forward of a passenger seat.

In yet another aspect, the table may further include first and second stabilizing arms synchronized to move inward in unison as the table moves in a direction of the stowed position and outward in unison as the table moves in a direction of the deployed position.

In yet another aspect, one end of the first stabilizing arm may be pivotally attached to the first hinge and an opposite end of the first stabilizing arm may be slidably attached to a back of the table, and one end of the second stabilizing arm may be pivotally attached to the second hinge and an opposite end of the second stabilizing arm may be slidably attached to the back of the table.

In yet another aspect, the first and second non-parallel static rails may impart folding of the first and second hinges as the table moves toward the stowed position, and unfolding of the first and second hinges as the table moves toward the deployed position.

According to another embodiment of an invention, the present invention provides an aircraft passenger suite including a passenger seat, a static structure positioned directly forward of the passenger seat, and a tray table assembly deployable from beneath the static structure, the tray table assembly including a table, first and second non-parallel static rails attached to an underside of the static structure, and first and second hinges attaching the table to the first and second non-parallel static rails, the first and second hinges configured to travel along the first and second non-parallel static rails to move the table between a stowed position and a deployed position, wherein the table when in the stowed position is underneath the static structure, and the table when in the deployed position is close to the seat and vertically lower than when in the stowed position.

In another aspect, each of the first and second hinges may be attached at one end to one side of the table and at an opposite end to a carriage configured to travel along one of the first and second non-parallel static rails.

In yet another aspect, the first and second non-parallel static rails may converge in a direction of the stowed position and may diverge in a direction of the deployed position.

In yet another aspect, the first and second hinges may rotate toward a vertical orientation as the table travels from the stowed position to the deployed position, and the first and second hinges may rotate toward a horizontal orientation as the table travels from the deployed position to the stowed position.

In yet another aspect, upper ends of the first and second hinges may move toward each other as the table travels in a direction of the stowed position and may move apart from one another as the table travels in a direction of the deployed position.

In yet another aspect, the table may include first and second stabilizing arms synchronized to move inward in unison as the table moves in a direction of the stowed position and outward in unison as the table moves in a direction of the deployed position.

In yet another aspect, the first and second non-parallel static rails may impart folding of the first and second hinges as the table moves toward the stowed position, and unfolding of the first and second hinges as the table moves toward the deployed position.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
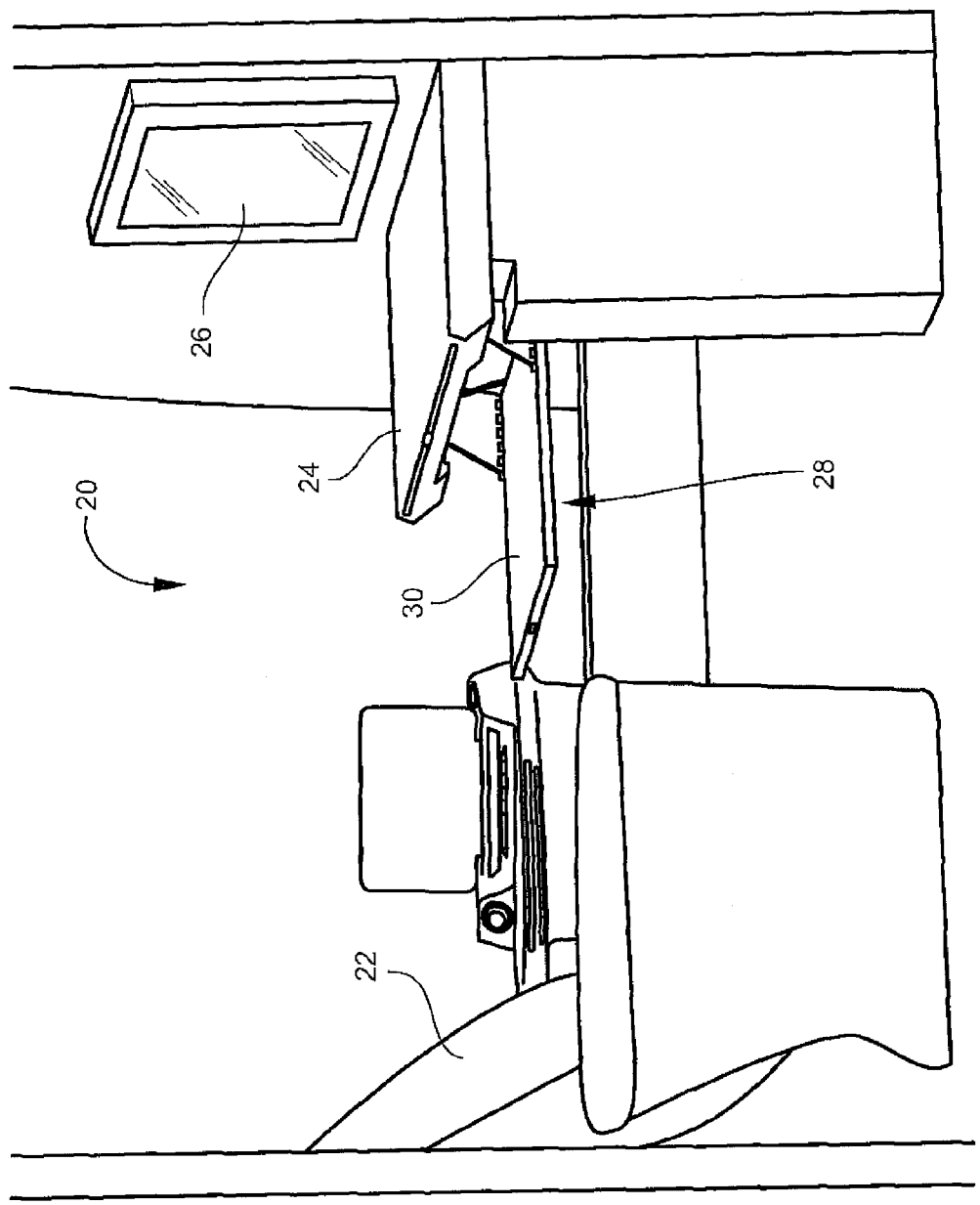
FIG. 1 is a side view of an aircraft passenger suite including a deployable dining table according to an embodiment of the invention, and showing the positional relationship between the dining table and a passenger seat within the suite.

FIG. 1 shows an aircraft passenger suite 20 according to an embodiment of the invention. Suite 20 can be of the type found in a premium seating class of a cabin layout, which may include a plurality of like suites and different suites in a nested arrangement to maximize seating density while providing privacy and a feeling of open space. Suite 20 as shown generally includes an adjustable passenger seat 22 and a static structure 24 positioned directly forward of the seat 22. As shown, the static structure 24 is a horizontal desk or vanity positioned at a vertical height higher than what would be considered an ergonomic position for dining. A video monitor 26 is positioned above the static structure 24 and directly forward of the seat 22 for optimal viewing angle.

A deployable table assembly 28 according to an embodiment of the invention deploys from beneath the static structure 24. A table 30 of the table assembly 28 is configured to move, by way of combined horizontal translation and vertical translation, between a stowed position in which the table 30 is entirely underneath the static structure 24, and deployed position forward of and vertically lower than when in the stowed position. In other words, the table 30 stows underneath the static structure 24 when not being used, and deploys forward and lower for use. Thus, the table 30 is configured to fore, aft and vertical motion. The compound movement deploys the table 30 close to the seat 22 at an ergonomic position for dining. As shown, the underside of the desk may include a recess for receiving the table 30 therein when the table 30 is stowed.

Figure 2:
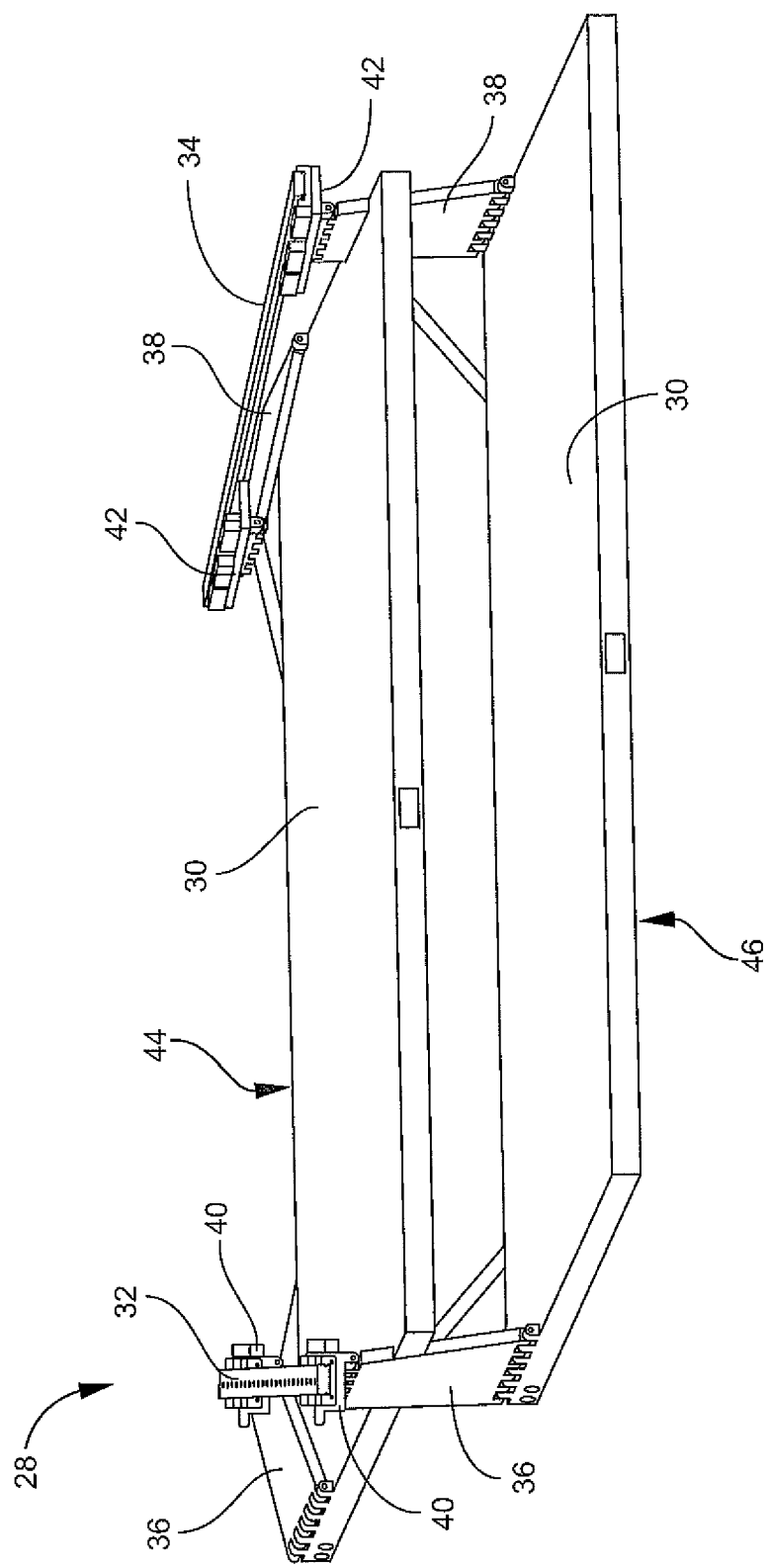
FIG. 2 is a front and top perspective view of the deployable dining table showing both stowed and deployed table positions.
Figure 3:
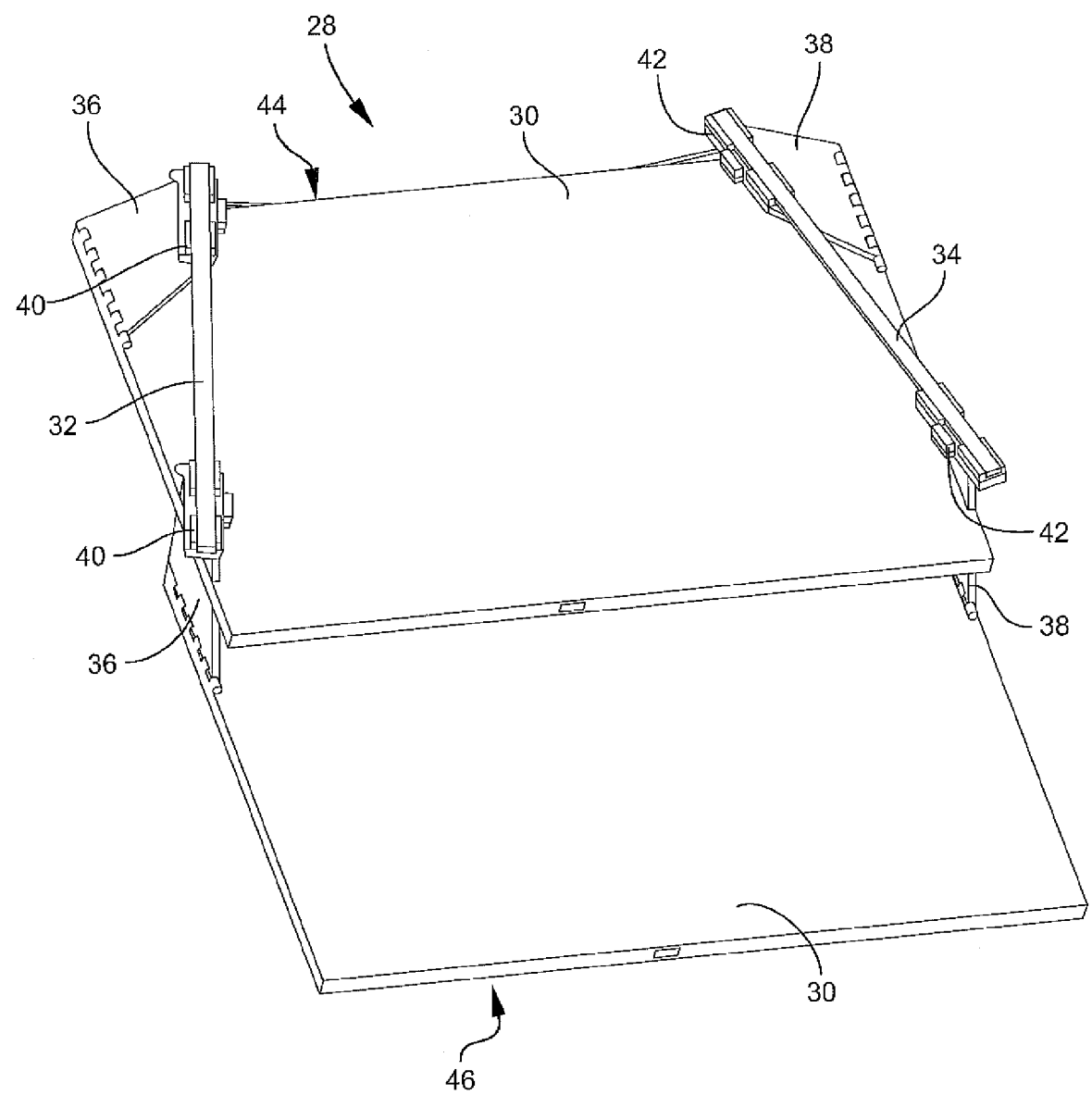
FIG. 3 is a top perspective view of the dining table of FIG. 2 showing the angled slides and hinge movement between the stowed and deployed table positions.
Figure 4:
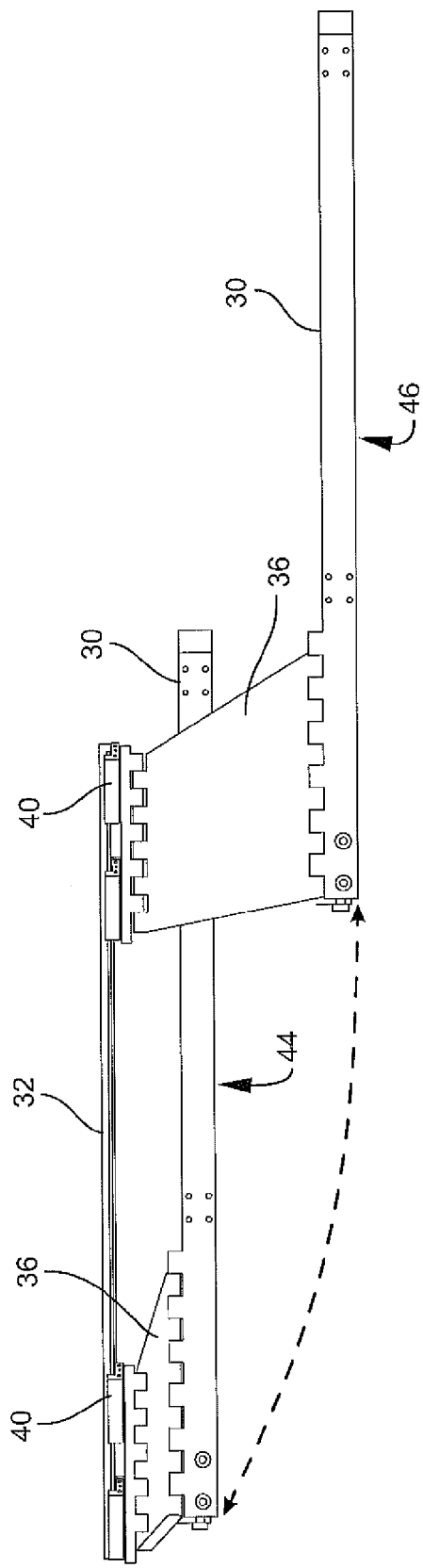
FIG. 4 is a side elevation view of the dining table of FIG. 2 showing both the stowed and deployed table positions and elliptical travel path.

FIGS. 2-4 show the deployable table assembly 28 separate from the static structure. While conventional dining tables may be capable of linear movement forward and aft, the present table 30 is hinged for compound movement, i.e., simultaneous movement forward/aft and up/down along an elliptical path. The assembly 28 generally includes the table 30, first and second non-parallel static rails 32, 34, and first and second hinges 36, 38 attaching the table 30 to the first and second non-parallel static rails 32, 34. The first and second hinges 36, 38 are configured to travel along the first and second non-parallel static rails 32, 34 by way of first and second carriages 40, 42 to selectively move the table 30 between the stowed and deployed positions, wherein the table 30 when in the deployed position is forward of and vertically lower than the table 30 when in the stowed position. Reference numeral 44 indicates the stowed configuration of the table 30. Reference numeral 46 indicates the deployed configuration of the table 30.

The first and second static rails 32, 34, first and second hinges 36, 38, and first and second carriages 40, 42 are all provided in pairs (i.e., right and left members), which cooperate to guide and support the left and right sides of the table 30. Each of the first and second hinges 36, 38 is attached at one end (i.e., the "lower" end) to one side of the table 30, and at the opposite end (i.e., the "upper" end) to its respective one of the carriages 40, 42. The carriages 40, 42 travel together along the length of the static rails 32, 34 forward and aft.

The first and second static rails 32, 34 are non-parallel, and specifically, converge in the direction of the stowed position and diverge in the direction of the deployed position. In this arrangement, movement of the table 30 in the forward direction, i.e., towards the seat 22 (see FIG. 1) causes the first and second hinges 36, 38 to rotate toward a vertical orientation, and movement of the table 30 in the aft direction, i.e., away from the seat 22, causes the first and second hinges 36, 38 to rotate toward a horizontal orientation. In a specific embodiment, the hinges 36, 38 can be vertical when the table 30 is fully deployed and horizontal when the table 30 is fully stowed, thus compact stowage conducive for aircraft.

As best shown in FIG. 3, the upper ends of the first and second hinges 36, 38 move inward, i.e., toward each other, as the table 30 travels in the direction of the stowed position indicated at 44, and move outward, i.e., apart from one another, as the table 30 travels in a direction of the deployed position indicated at 46. In other words, the first and second hinges 36, 38 fold inward as the table 30 is stowed and fold outward as the table 30 is deployed. Table movement can be manual or automated. The first and second non-parallel static rails 32, 34 are elongate linear rails adapted to attach to the underside of the static structure positioned forward of the seat.

Figure 5:
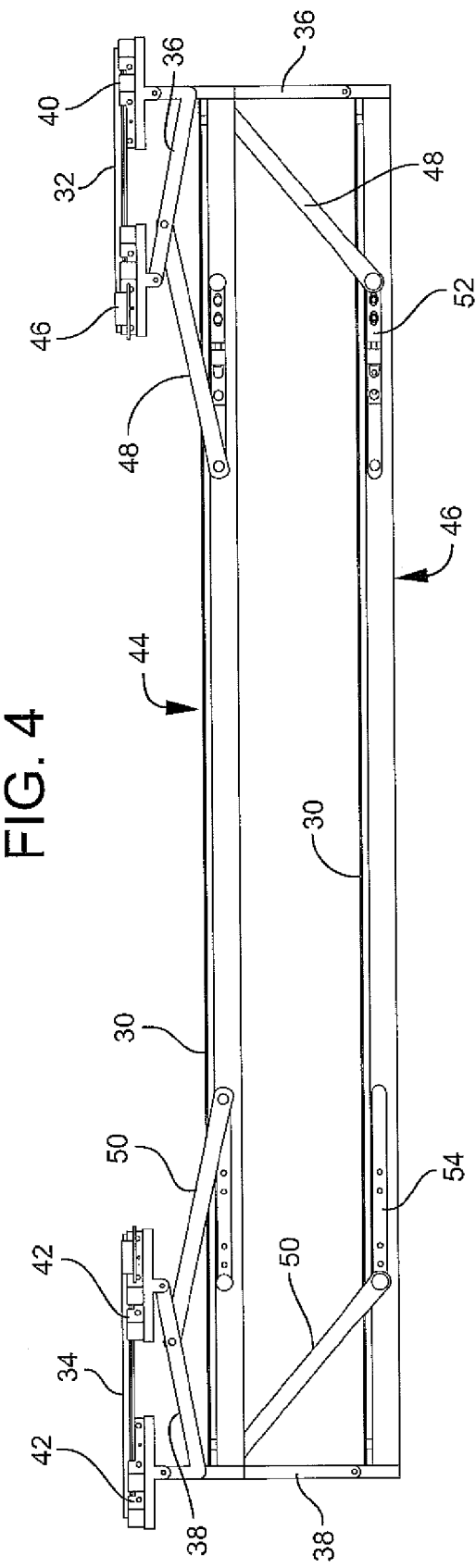
FIG. 5 is a rear view of the table of FIG. 2 showing both the stowed and deployed table positions and further illustrating stabilizing arms.

FIG. 5 shows first and second stabilizing arms 48, 50 that prevent the table 30 from swaying laterally. The first and second stabilizing arms 48, 50 are synchronized to move inward in unison as the table 30 is stowed and outward in unison as the table 30 is deployed. One end of the first stabilizing arm 48 is pivotally attached to the first hinge 36, while the opposite end of the first stabilizing arm 48 is slidably attached at the back of the table 30, for example, attached to a first spring-biased stabilizing mechanism 52 in the back of the table. One end of the second stabilizing arm 50 is pivotally attached to the second hinge 38, while the opposite end of the second stabilizing arm is slidably attached at the back of the table 30, for example, attached to a second spring-biased stabilizing mechanism 54 in the back of the table.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A deployable table assembly, comprising:
   a table configured to move between a stowed position and a deployed position;
   first and second non-parallel static rails mounted above the table such that the first and second non-parallel static rails converge in a direction of the stowed position and diverge in a direction of the deployed position;
   first and second carriages slidable along the respective first and second non-parallel static rails;
   a first hinge interconnecting the table and the first carriage; and
   a second hinge interconnecting the table and the second carriage;
   wherein movement of the first and second carriages along the first and second non-parallel static rails drives rotation of the first and second hinges such that the table when in the deployed position is forward of and vertically lower than the table when in the stowed position.

2. The deployable table assembly of claim 1, wherein the first hinge is hingedly attached at one end to the table and at an opposite end to the first carriage, and the second hinge is hingedly attached at one end to the table and at an opposite end to the second carriage.

3. The deployable table assembly of claim 1, wherein the first and second hinges rotate toward vertical as the table travels from the stowed position to the deployed position, and the first and second hinges rotate toward horizontal as the table travels from the deployed position to the stowed position.

4. The deployable table assembly of claim 1, wherein upper ends of each of the first and second hinges move toward each other as the table travels in a direction of the stowed position and move apart from one another as the table travels in a direction of the deployed position.

5. The deployable table assembly of claim 1, wherein the first and second non-parallel static rails are adapted to be attached to an underside of a static structure positioned forward of a passenger seat.

6. The deployable table assembly of claim 1, further comprising first and second stabilizing arms interconnecting the respective first and second hinges and the table, the first and second stabilizing arms synchronized to move inward in unison as the table moves in a direction of the stowed position and outward in unison as the table moves in a direction of the deployed position.

7. The deployable table assembly of claim 6, wherein one end of the first stabilizing arm is pivotally attached to the first hinge and an opposite end of the first stabilizing arm is slidably attached at a back of the table, and one end of the second stabilizing arm is pivotally attached to the second hinge and an opposite end of the second stabilizing arm is slidably attached at the back of the table.

8. The deployable table assembly of claim 1, wherein the first and second non-parallel static rails impart folding of the first and second hinges as the table moves toward the stowed position, and unfolding of the first and second hinges as the table moves toward the deployed position.

9. An aircraft passenger suite including a passenger seat, a static structure positioned directly forward of the passenger seat, and a tray table assembly deployable from beneath the static structure, the tray table assembly comprising:
   a table configured to move between a stowed position and a deployed position;
   first and second non-parallel static rails mounted above the table such that the first and second non-parallel static rails converge in a direction of the stowed position and diverge in a direction of the deployed position;
   first and second carriages slidable along the respective first and second non-parallel static rails;
   a first hinge interconnecting the table and the first carriage; and
   a second hinge interconnecting the table and the second carriage;
   wherein movement of the first and second carriages along the first and second non-parallel static rails drives rotation of the first and second hinges such that the table when in the deployed position is forward of and vertically lower than the table when in the stowed position.

10. The aircraft passenger suite of claim 9, wherein the first hinge is hingedly attached at one end to the table and at an opposite end to the first carriage, and the second hinge is hingedly attached at one end to the table and at an opposite end to the second carriage.

11. The aircraft passenger suite of claim 9, wherein the first and second hinges rotate toward vertical as the table travels from the stowed position to the deployed position, and the first and second hinges rotate toward horizontal as the table travels from the deployed position to the stowed position.

12. The aircraft passenger suite of claim 9, wherein upper ends of each of the first and second hinges move toward each other as the table travels in a direction of the stowed position and move apart from one another as the table travels in a direction of the deployed position.

13. The aircraft passenger suite of claim 9, further comprising first and second stabilizing arms interconnecting the respective first and second hinges and the table, the first and second stabilizing arms synchronized to move inward in unison as the table moves in a direction of the stowed position and outward in unison as the table moves in a direction of the deployed position.

14. The aircraft passenger suite of claim 13, wherein one end of the first stabilizing arm is pivotally attached to the first hinge and an opposite end of the first stabilizing arm is slidably attached at a back of the table, and one end of the second stabilizing arm is pivotally attached to the second hinge and an opposite end of the second stabilizing arm is slidably attached at the back of the table.

15. The aircraft passenger suite of claim 9, wherein the first and second non-parallel static rails impart folding of the first and second hinges as the table moves toward the stowed position, and unfolding of the first and second hinges as the table moves toward the deployed position.

\* \* \* \* \*